(No Model.)
T. W. SHEPHERD.
ADJUSTABLE JOURNAL BEARING.
No. 360,117. Patented Mar. 29, 1887.
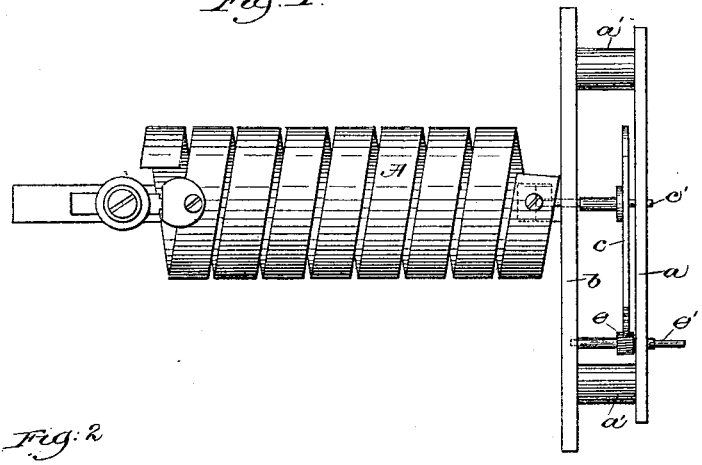
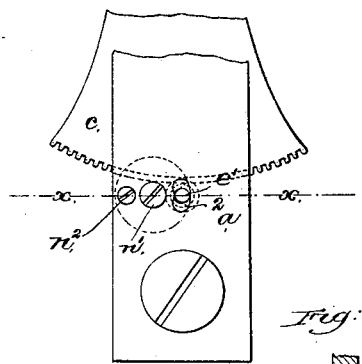
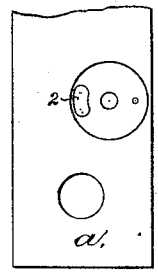
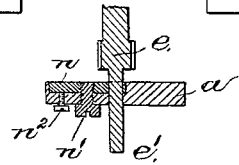
Witnesses
Fred L. Emery.
John F. ...
Inventor
Thomas W. Shepherd
by Crosby & Gregory
attys.
N. PETERS, Photo-Lithographer, Washington, D. C.

UNITED STATES PATENT OFFICE.

THOMAS W. SHEPHERD, OF PEABODY, MASSACHUSETTS.

ADJUSTABLE JOURNAL-BEARING.

SPECIFICATION forming part of Letters Patent No. 360,117, dated March 29, 1887.

Application filed June 15, 1886. Serial No. 205,268. (No model.)

*To all whom it may concern:*

Be it known that I, THOMAS W. SHEPHERD, of Peabody, county of Essex, State of Massachusetts, have invented an Improvement in Adjustable Journal-Bearings, of which the following description, in connection with the accompanying drawings, is a specification, like letters on the drawings representing like parts.

This invention has for its object to provide special means for adjusting one of two intermeshing toothed surfaces with relation to the other, whereby the said toothed surfaces may contact at the "pitch-line," as it is called, and avoid irregularity of motion between the said toothed parts, or avoid any shake or backlash, also rubbing of one surface on the other.

In accordance with my invention, as herein embodied, an arbor carrying a toothed wheel or pinion has one of its bearings in an adjustable plate or disk, preferably circular, the said plate or disk being supported by the frame-work and adjustable therein, and being retained in adjusted position by a suitable locking device, (shown as a set-screw,) said plate or disk being movable about its axis eccentrically to the axis of the arbor, to thereby move the said arbor to and from the co-operating toothed surface, (herein shown as a toothed segment,) and thereby place the teeth of the said toothed wheel or pinion into mesh with the said toothed surface in such manner as to insure contact of the teeth at the pitch-line.

The invention is herein shown as applied to a metallic thermometer of the class represented in United States Patent No. 330,161, dated January 10, 1885.

Figure 1, in side elevation, shows some of the operating parts of a thermometer of the class referred to supplied with adjusting devices embodying this invention; Fig. 2, a right-hand end view of a portion of Fig. 1, on an enlarged scale; Fig. 3, a rear side view of the top plate, showing the circular disk; and Fig. 4, a cross-section of Fig. 2 taken on the dotted line $x$ $x$, Fig. 2.

In the present embodiment of my invention, the frame-work, consisting of the plates $a$ $b$, joined together by the parts or standards $a'$, the toothed segment $c$, and its arbor $c'$, having its bearings in the frame-work, the pinion $e$ and its arbor $e'$, also having one of its bearings in the frame-work, said arbor $e'$ carrying a pointer, (not shown,) and the lamina or helical coil A for rotating the arbor $c'$, are all as in the patent referred to, so need not be herein further described.

Instead of providing the arbor $e'$ with two fixed bearings, as in the apparatus described in the said patent, I have supported that part of the said arbor nearest the wheel or pinion $e$ in a bearing at or near one edge of a plate or disk, $n$, preferably circular in shape, and pivoted at its center on a screw, $n'$, the said plate or disk being seated in a circular recess in the plate $a$ and held in adjusted position by a suitable locking device. (Shown as a screw, $n^2$.)

The opening in the plate $a$, where the arbor $e'$ passes through it, is of sufficiently greater size than the arbor as to permit the arbor to be moved bodily therein when the plate or disk is turned on its center screw or pivot, $n'$. To adjust the wheel or pinion $e$ so that its teeth shall engage with the teeth of the toothed surface $c$ at the pitch-line, it is only necessary to loosen the screw $n^2$ and turn the plate or disk $n$ a short distance, a very little adjustment of the said plate or disk being sufficient to enable the said teeth to be brought in operative contact at the pitch-line.

While I have herein shown the invention in connection with thermometers, it is obvious that the same may be embodied in numerous devices—such as clock and watch movements and the like, and in fact in any case where two toothed wheels or surfaces intermesh with each other, and it is desired to adjust one with relation to the other.

I claim—

The toothed wheel or pinion mounted upon an arbor, and a toothed surface engaged by the said wheel or pinion, combined with an adjustable circular disk to constitute one of the bearings for the said arbor, whereby the said arbor and its attached wheel or pinion may be adjusted with relation to the said toothed surface to insure the engagement of the teeth of the said pinion and toothed surface at the pitch-line, substantially as described.

In testimony whereof I have signed my name to this specification in the presence of two subscribing witnesses.

THOMAS W. SHEPHERD.

Witnesses:
SAML. C. LORD,
THOS. H. JACKMAN.